S. E. WINDER.
GLASS MANUFACTURING MACHINERY.
APPLICATION FILED NOV. 28, 1919.

1,431,436.

Patented Oct. 10, 1922.
8 SHEETS—SHEET 1.

Fig.1

Witness

Inventor
Samuel E. Winder.
By Andrews & Lundell
Attorneys

Fig. 6

Patented Oct. 10, 1922.

1,431,436

UNITED STATES PATENT OFFICE.

SAMUEL E. WINDER, OF CHICAGO, ILLINOIS.

GLASS-MANUFACTURING MACHINERY.

Application filed November 28, 1919. Serial No. 341,066.

*To all whom it may concern:*

Be it known that I, SAMUEL E. WINDER, a citizen of the United States, residing at Chicago, in the county of Cook and State of Illinois, have invented certain new and useful Improvements in Glass-Manufacturing Machinery, of which the following is a specification.

This invention relates to machinery for molding and blowing bottles, and particularly wide-mouth bottles, and I have selected milk bottles as preferable for the purpose of illustrating the invention and the machinery used in carrying out the invention.

The object of the invention is to provide suitable machinery for manufacturing wide-mouth bottles, which is not only dependable but is very rapid in its operation, and will produce a very high quality of bottles. As a special object I provide improved means for forming portions of the mold for molding the blanks for the bottles, and means for operating the movable portions of the molds. As a further object I provide improved means for transferring the molded blanks from the molding portion of the machine to the blowing portion of the machine. The other objects of the invention will be apparent from a consideration of the accompanying drawings and the description thereof which follows:

Of the accompanying drawings Figs. 1 and 2 form a complete plan view of the machine, Fig. 2 to be considered as immediately at the right of Fig. 1.

The method of making milk bottles which I have adopted, is the well known method of molding the molten mass of glass in molds in one portion of the machine, so as to form a blank suitable for blowing; and particularly of providing, by means of a suitable plunger, a recess, or chamber, in the blank in which the air for blowing the bottle to its permanent shape is received when the blank has been removed to the blowing portion of the machine. The machine in general, therefore, is divided into what may be called two distinct machines, the molding machine and the blowing machine. Each of these machines has for its central feature a rotating table which supports a plurality of molds, one set for preparing the blank for blowing and the other set for supporting the blank when the blowing is taking place. These tables are each rotated in any suitable manner step by step so as to carry the molds from one position to another, in order to operate properly upon the molten glass; and a sufficient number of molds are provided to allow the molten glass to settle or harden sufficiently for suitable operation.

The entire machine is mounted for convenience upon a truck 20 which may be moved on a track 21, for a short distance, by means of a pneumatic cylinder 22, or in any other suitable manner. The purpose of so moving the machine is to move it up to and away from the glass supplying mechanism, so that the machine will be in suitable position for receiving the molten glass from the feeding mechanism or outlet of the glass furnace, and may be removed from this position in order to more conveniently get at various portions of the machine or furnace, or for other reasons.

Any suitable glass furnace may be used with the machine, and also any suitable means for feeding the molten glass from the furnace and for cutting off suitable masses of glass as it flows outwardly from the furnace. A suitable furnace and feeding mechanism is fully described in the copending application of Winder and Daubenspeck, Patent No. 1,331,792, issued Feb. 24, 1920, and reference may be had thereto for further information in regard to such mechanism, that mechanism being no portion of the present invention.

Also any suitable driving means may be used for operating the mechanism; and any suitable mechanism may be employed for operating the tables of the machine, and the various other moving parts thereof. I prefer for the driving means any suitable form of electric motor, not shown, operating the driving wheel 25, which in turn, by means of suitable gearing 26 operates the main driving shaft 27. This driving shaft extends, as indicated, across both portions of the machine, and fixed to the shaft are the various means for properly operating the various moving parts of the machine. By having substantially all of the operating mechanism under the direct control of this single shaft 27 proper coaction of the various parts is arrived at in a very dependable manner; the speed of operation of the machine, by thus eliminating any lost motion or improper coaction of the parts, is materially increased.

Figure 1:
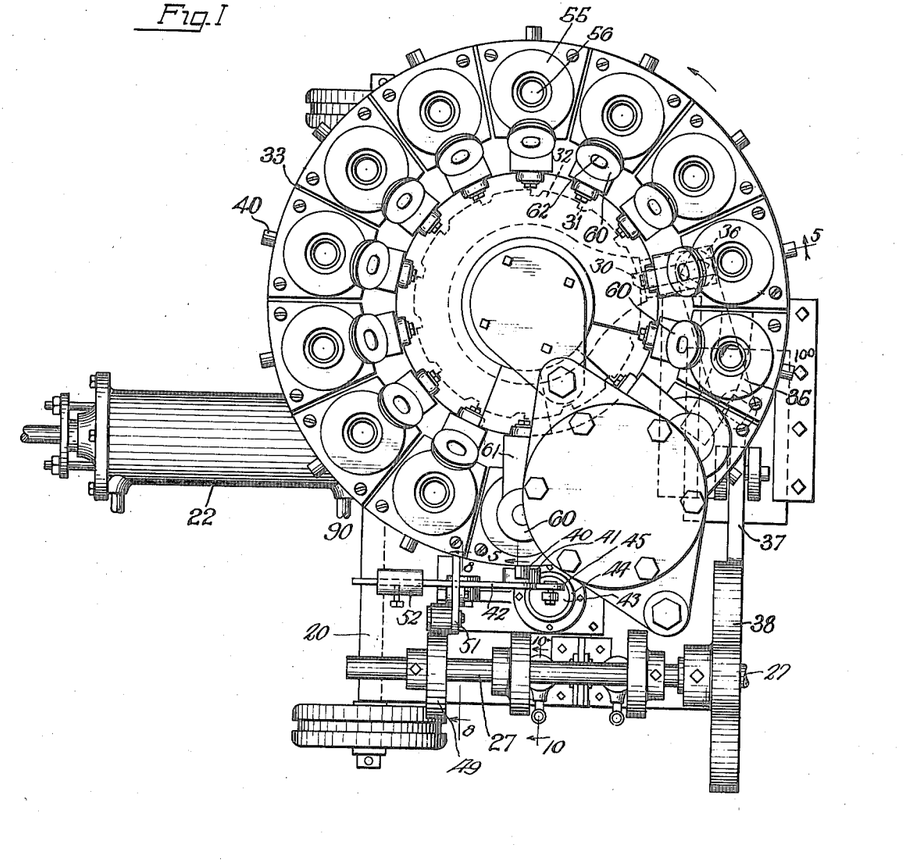

The molding table, shown in Fig. 1, may be rotated step by step in any suitable manner. I prefer for the purpose a mechanism similar in general to the table operating mechanism which is illustrated and described in my copending application filed July 2, 1919, Serial Number 308,193, but have embodied in this machine some improvements over the mechanism of said application. In particular I provide a pawl 30 adapted to play in the notches 31 of the disk 32, fixed to the mold supporting table 33, of the machine; the pawl being backed by a spring 34, and being reciprocated by means of a link 35, pivoted to the pawl casing 36, and also pivoted by its other end to the link 37, which is reciprocated by means of the cam 38 fixed to the driving shaft 27.

In order to insure stopping the table in exactly the right position, I provide a pin 40 projecting radially from the periphery of the table opposite the center of each mold, and as the table rotates to adjacent the proper position for stopping, the pin passes over a roller 41 fixed to a pivoted arm 42. As the arm 42 is pressed downwardly by the roller, a piston 43 in a dash pot cylinder 44 is forced downwardly into the cylinder by means of the arm 45 and a connecting link 53; and the device is so adjusted that the compression of the air in the cylinder under the piston 43 will be sufficient to bring the table to rest when the pin 40 is immediately over the axis of the roller 41. This, however, may not stop the table in the exact position desired; and, to provide for bringing the table to the exact position desired, openings 46 (Fig. 8) are provided near the periphery of the table midway between each two molds, and a pin 47 is slidably mounted in a post 48 in such a position that when the pin 47 is allowed, by the cam wheel 49 and the arm 51, to be forced upward by the spring 50, the pointed end of the pin will pass into the opening 46 and bring the molds to exactly the position desired. Then when the driving shaft 27, upon which the cam wheel 49 is mounted, is rotated to the proper position for moving the table, the cam forces the pin out from the opening in the table by means of the connecting lever 51, and the table is free to rotate. The piston 43 is then raised by the weight 52.

The molds 55 of the molding machine are of any suitable shape, hollowed out so as to receive the molten glass from the glass feeding mechanism; and so formed as to suitably form the molten mass into a blank to be blown into the finished shape. Each of these molds is provided with a valve 56 for closing the bottom of the mold, the valve having a stem 57 by means of which the glass blank is pressed upwardly from the mold when it is in suitable shape for removing therefrom. The means which I provide for operating this valve comprises a cam strip 58 fixed to the framework of the machine so that, as the table rotates in the direction of the arrow of Fig. 1, the lower end of the valve stem will come in contact with the cam surface and will be, at the proper time, forced upwardly, thus forcing the blank from the mold. A ring 59 fixed to the stem 57, prevents any abnormal elevation of the stem and valve at any time.

Each mold also has a cover or cap 60 which has its lower side shaped so as to fit properly on the upper end of the mold and thus to form the mouth of the bottle, the particular shape of the lower surface of the cap depending upon the particular shape into which it is desired to finally form the mouth of the bottle. By the use of a cap for each mold the cap may be left on the mouth of the bottle until the glass has set sufficiently to prevent any flowing thereof, or other deformation when the cover is removed.

It is understood that these caps are on the molds when the glass is being molded; but in order to receive the glass in the molds, and for cooling and for other purposes, it is desirable, during a portion of the time, to have the caps removed from the molds. Any suitable mechanism may be provided for removing the caps when desired, but I prefer for the purpose the following: Each cap 60 passes through a plate 61 which is pivoted, at the point 65, to an upright support 66 which is slidably mounted in guides 67, the lower end of the upright having fixed thereto a pin 68 supporting a roller 69 which is arranged to run upon a cam 70. The arrangement is such that when the cap is on the mold the wheel 69 is on the lower surface of the cam; but when the cap is to be raised the wheel passes upwardly on to the upper surface of the cam. This causes the upright 66 to be forced upwardly and to carry with it the cap, and thus raises the plate 61, together with the cap, a short distance vertically from the mold without any rotation of the plate on its pivot; otherwise abnormal deformation of the mouth of the milk bottle might result by the tilting of the cap. When the cap is thus raised a sufficient distance the plate, with the cap, is tilted inwardly by means of a link 72 pivoted to the plate and having a slot 73 in which plays a pin 74 fixed to a lug 75 which is stationary, in this instance being fixed to the guides 67. The upward movement of the cap without tilting is thus possible so long as the pin 74 moves in the slot 73; but when the pin comes in contact with the lower end of this slot the cap will be tilted inwardly. In order to positively force the plate and cap down to the closed position, I provide an upper cam surface 76 which, when the proper point is reached, prevents the wheel 69 from continuing in its elevated position, and forces it downwardly, so as to close the mold.

Any suitable mechanism may be provided for molding the glass after it has been received in the molds. Such mechanism is fully described in my copending application filed July 25, 1919, Serial Number 313,210, which comprises in general a driving cylinder 80 supplied in a suitable manner with compressed air, and a cushioning cylinder 81 inserted in the connecting means 82 between the piston of the cylinder 80 and the plunger 83. For a more specific description of the plunger operating means reference may be had to said copending application. It is understood, of course, that the form of the plunger 83 is such as is desired to properly form the recess in the molten mass, and that suitable mechanism is operated by the driving shaft 27 for passing compressed air to the cylinder 80, for forcing the plunger downwardly at the proper time, and for elevating it after the molding process is completed. And it is further understood that each cap 60 has an opening 62 through which the plunger passes.

In general the operation of the molding machine is as follows: The molten glass is received from the feeding mechanism of the furnace into one of the molds. I prefer to feed the mass into one of the molds adjacent the numeral 90. The table is then rotated two or three steps, in order to allow sufficient time for the glass to settle and become in suitable condition for the molding process, and as these steps are taken the plate 61 and cap 60 are moved downwardly in place by the cams 70 and 76. When the mold is brought to rest at exactly the right point, by means of the dash pot mechanism, and particularly the pin 47, the plunger 83 is forced downwardly, suitable movement thereof and suitable pressure thereon being provided for by means of the cylinders 80 and 81 and otherwise. The plunger is then removed and the table is again rotated step by step, the cap 60 of the mold being raised, until the mold containing the formed blank arrives at the proper position for being transferred to the glass molding machine. This position must be such that in the mean time the glass has had time to harden by cooling sufficiently to be in condition for transferring without deformation. I prefer to take the mass from the mold when it is opposite the position marked 100, having taken two steps from the plunger mechanism, and having, by this time, the cap 60 removed and tilted inwardly. Therefore I arrange the cam 58 so that the valve stem 57 will force the molded blank upwardly just as it reaches the point 100. The cam raises the blank sufficiently to be grasped by suitable clamps, but not so as to allow the blank to be in danger of falling off from the mold.

Figure 2:
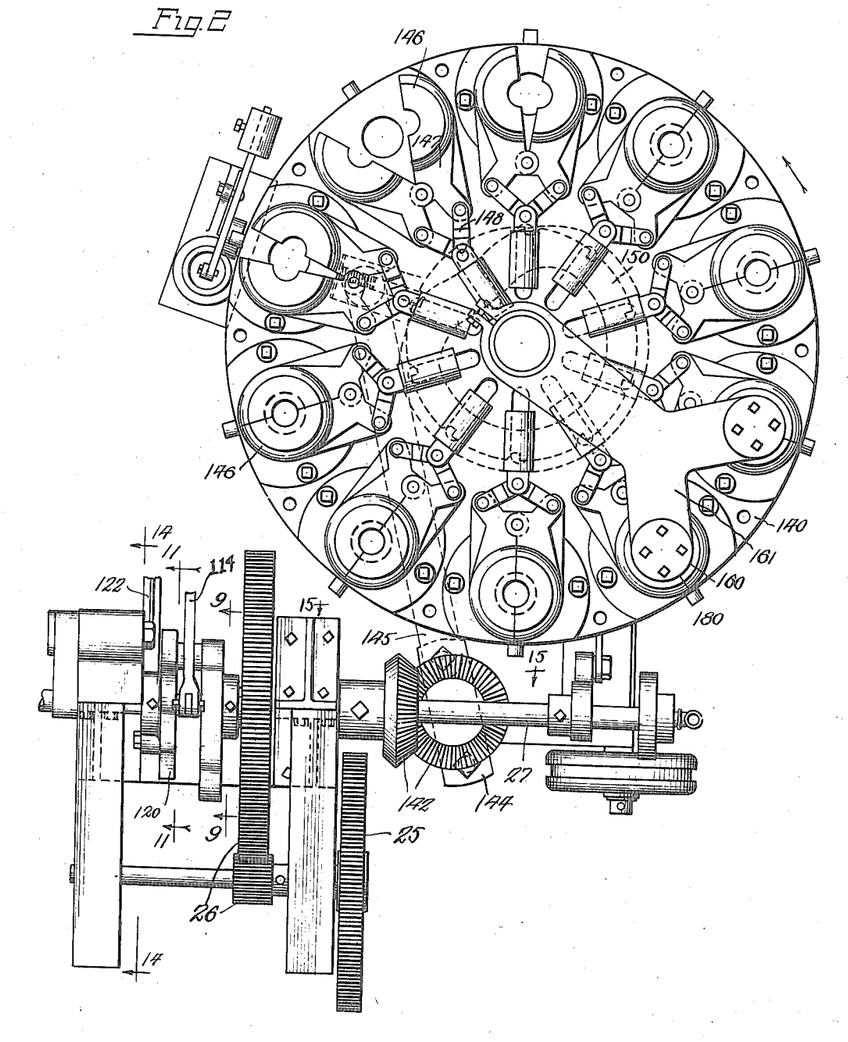
Figure 3:
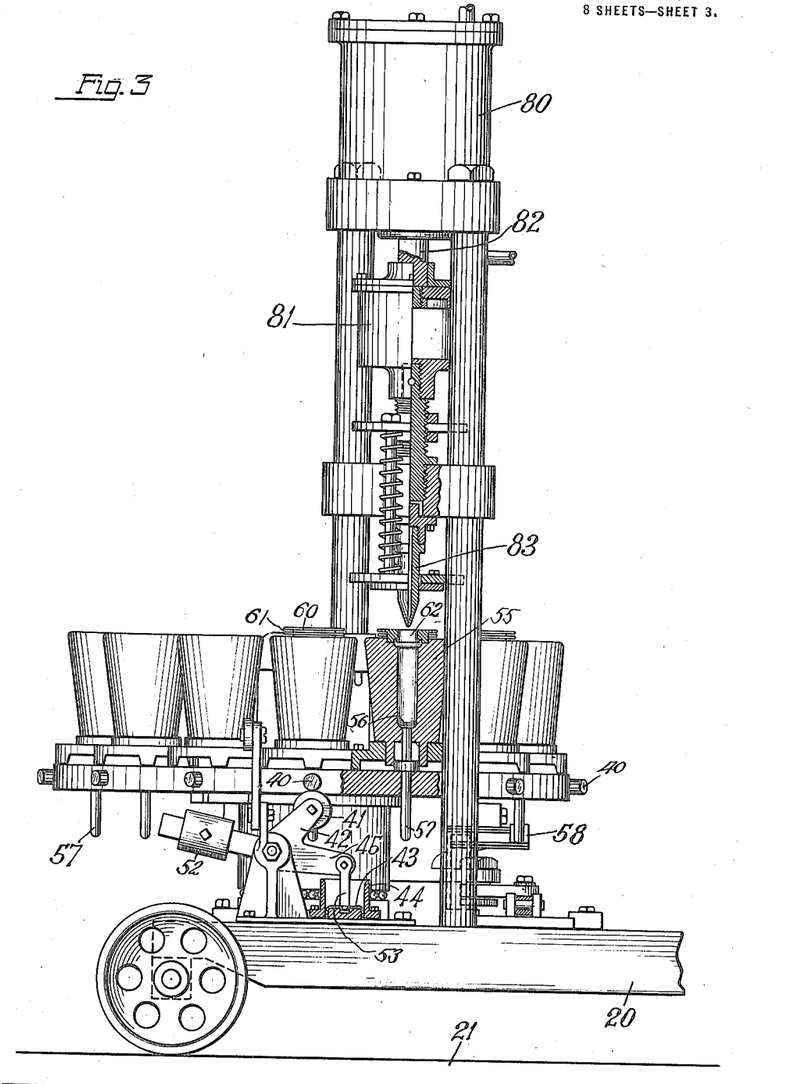
Figs. 3 and 4 form a front elevation of the machine with certain portions omitted for simplicity, Fig. 4 being considered as immediately at the right of Fig. 3.
Figure 4:
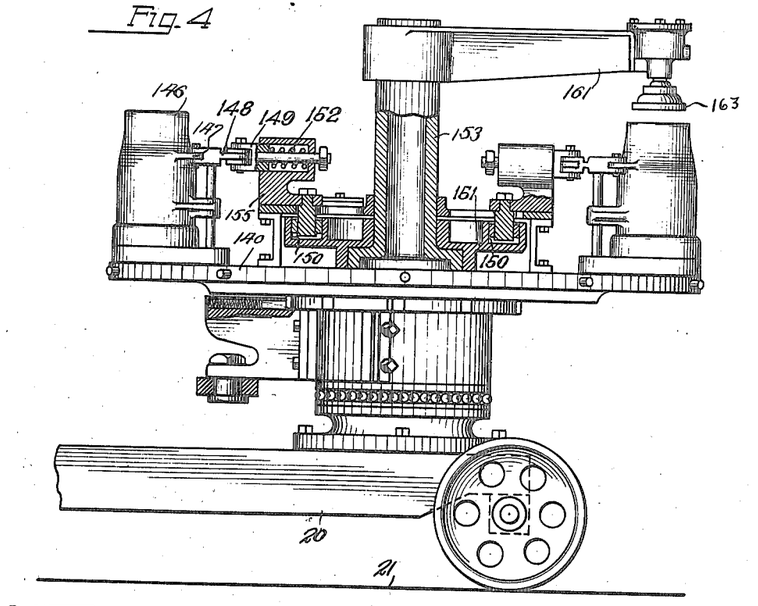
Figure 5:
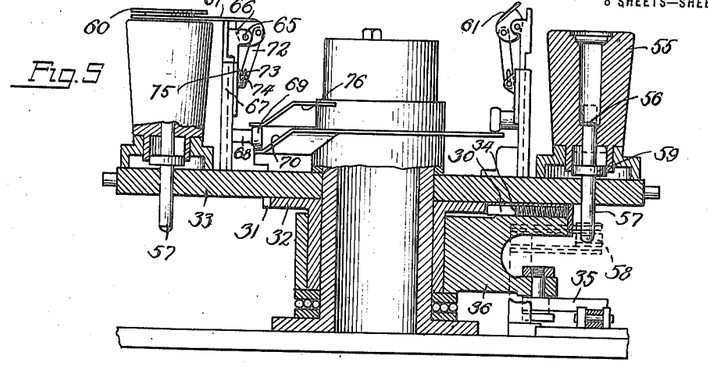
Fig. 5 is an angular sectional view along the lines 5—5 of Fig. 1.

Any suitable mechanism may be used for transferring the molded blank from the molding machine to the blowing machine. I prefer for the purpose the mechanism shown in Fig. 6. To simplify the drawings the transferring mechanism is not shown in Figs. 1 or 2. The mechanism comprises a clamp having jaws 105 for grasping the upper end of the molded blank as it is supported by the raised valve; and also jaws 106 for enclosing the lower end of the blank when the blank has been raised by the jaws 105 a suitable distance above the mold. The jaws 106, however, merely enclose the blank, without grasping it; and this prevents any sidewise swinging of the lower end of the blank. In general the operation is to cause the clamp jaws 105 to descend and pass between the jaws 106; then the jaws 105 grasp the upper end of the blank; then they are elevated, lifting upward the blank; then the lower jaws 106 close and thus enclose the lower end of the blank; then the entire apparatus with the blank is oscillated so as to position the blank exactly over the glass blowing mold; then the jaws 105 are lowered, and at the same time opened and the jaws 106 are also opened, the jaws 105 passing between the jaws 106, then the jaws 105 are elevated; and then the apparatus is rotated back again, so as to place the jaws in the proper position for grasping another molded blank.

Figure 6:
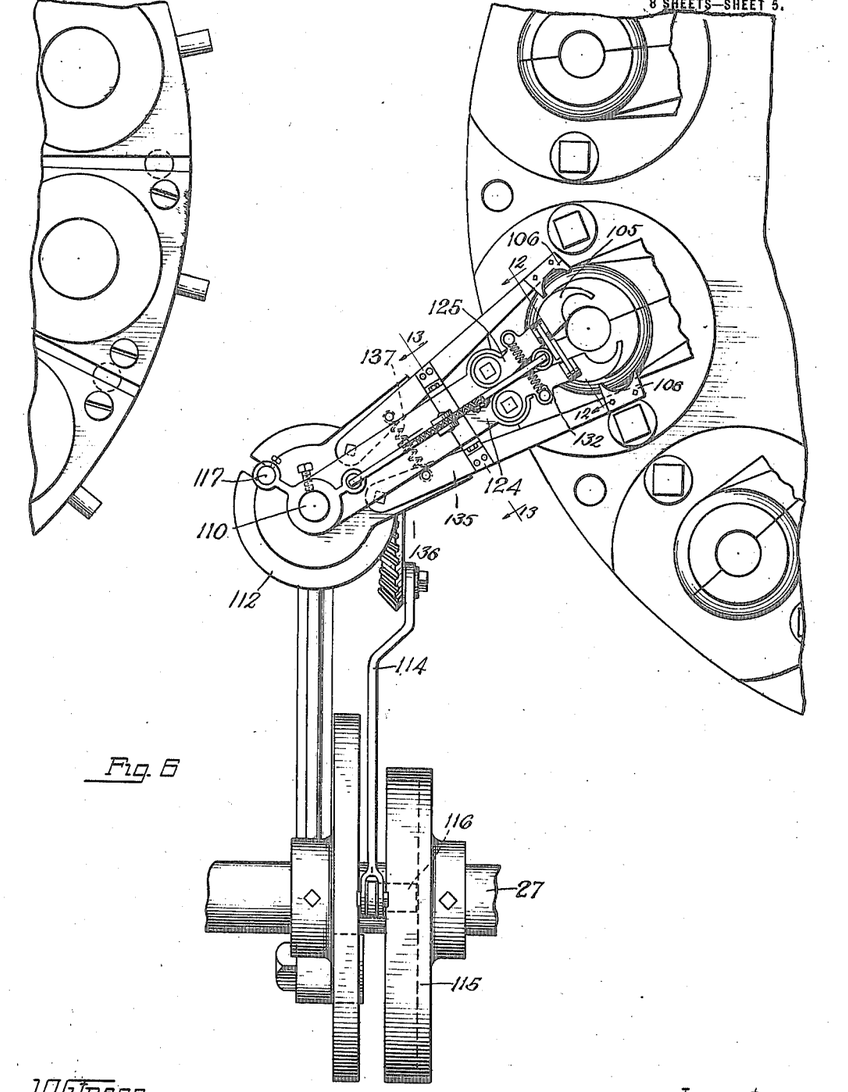
Fig. 6 is an enlarged detail view of the means for transferring the molded blanks from the molding table to the blowing table.

These operations are carried out by suitable mechanism in the following manner: A vertical rod 110 is slidably mounted in a supporting post 111. To this rod 110 is fixed the support 124 of the jaws 105. Slidably but nonrotatably mounted upon this rod 110 is a beveled gear 112 which meshes with a gear segment 113. The gear segment 113 is connected to a link 114 which, at the proper time, is suitable reciprocated by means of the driving shaft 27 and a cam wheel 116 fixed to the shaft, the cam operating the bar 115, which in turn reciprocates the link 114. The reciprocations of the link 114 operating the segment 113 and the wheel 112, rock the rod 110, and thus oscillate the jaws 105. One movement of the link 114 is sufficient to move the clamp jaws 105 from their position over one of the molds of one of the machines to their position over one of the molds of the other machine. At the same time the jaws 106 are similarly moved, in a manner hereinafter explained. During one rotation of the driving shaft 27 the bottle is completely molded, and at the same time another bottle is blown; hence, during one rotation of the shaft there is a double reciprocation of the link 114, which at the proper times causes the jaws to move from the molding machine to the blowing machine and then back from the blowing machine to the molding machine.

The following means are used for elevating and lowering the clamp jaws 105: A cam 120, fixed to the driving shaft 27, twice during each rotation of the shaft 27, forces downwardly the end 121 of the lever 122; and this lever in turn, by means of the connecting link 123, moves upwardly the slidably mounted bearing 119 which is fixed to the lugs 118 to which the link 123 is pivoted. The bearing 119 moves the rod 110 upwardly and carries with it the clamp support 124, fixed to the upper end of the rod. When the cam 120 rotates further the jaws 105 move downwardly to grasp the molded blank. As the cam 120 continues to rotate the jaws 105 are moved upwardly at the proper time; and then, after the rotation to the blowing machine the jaws move downwardly to release the molded blank in the blow mold; and then they are raised again.

The means which I prefer for opening and closing, at the proper time, the jaws 105, are as follows: The arms 125 to which the jaws 105 are fixed are pivoted to the clamp support 124. As the clamp support 124 moves downwardly over either mold a pin 126, slidably mounted in the clamp support 124, strikes upon a table 127 and is stopped in its downward movement. As the clamp support continues to move downwardly the lever arm 128, being stopped in its downward movement by the pin 126, forces downwardly the lever arm 129, and with it the pin 130. Links 133 connect the pin 130 with the arms 125; and the beveled portion 131 of the pin, passing between the two arms 125, forces them apart, and the links 133 continue to separate the arms against the spring 132 (Fig. 6), thus opening the jaws 105 and putting them in position either to grasp the molded blank in the mold of the molding machine, or to release the blank into the mold of the blowing machine, as the case may be.

In order to hold the pin in its proper positions I provide a link 134, pivoted to the support 124, and having two notches 138, the link being held against a stop 139 by a spring 141. The upper notch holds the mechanism properly for the open position of the jaws 105, and the lower notch holds it properly for the closed position of the jaws. After depositing the blank in the blow mold the jaws 105 remain open, the stop 139 remaining in the lower notch 138, until the jaws are rotated and lowered to grasp the blank from the molding mold; then as the support is lowered the lower end of the pin 130 strikes on the top of the mold 55, and the jaws are forced closed upon the blank by the spring 132.

The following means are provided for properly operating the clamp jaws 106 at suitable times. These jaws are mounted on arms 135, which are pivoted to a plate 136. The plate is fixed with reference to the gear wheel 112, and a rod 117 prevents rotation of the plate or wheel with reference to the rod 110, as the lower end of the rod 117 is fixed, by a collar 109 to the rod 110. The plate, however, is slidable with reference to the rods 117 and 110, so that the plate rotates with, but is not elevated with the rod 110, it being thus understood that the clamp jaws 106 always remain in the same horizontal plane. As the support 124 descends, as hereinabove explained, a member 170, fixed to the support 124, passes downwardly between the arms 135 and forces them apart against the spring 137, thus separating the jaws 106 at the proper times. As the support 124 is raised, the member 170 will pass from between the arms 135 and the jaws 106 will be closed by the spring 137. In this manner the jaws 106 are made to enclose the lower end of the molded blank, when the jaws 105 have elevated the blank out of the mold 55; then when the blank is moved to a position over the blow mold 146 of the blowing machine, the jaws 106 are opened by the member 170 as the jaws 105 descend to deposit the molded blank in the blow mold 146.

The mold table 140 is rotated in the same direction as the mold table 33, and in a somewhat similar manner. The operating mechanism therefor comprises beveled gears 142 mounted respectively on the driving shaft 27 and a shaft 143. Upon the shaft 143 is mounted an arm 144. To this arm is pivoted a link 145 which operates a pawl mechanism for rotating the table 140 somewhat similar to the pawl mechanism of the table 33.

Means are provided for opening and closing the blow molds 146. The molds are mounted on arms 147, pivoted to the table, and operated by links 148 pivoted to a member 149. The member 149 is slidably mounted in another slidably mounted member 155. The member 155 is forced inwardly and outwardly at the proper times by the camway 150 mounted on the plate 151, which is fixed to the nonrotatable pillar 153. A spring 152 normally presses the member 149 outwardly to close the jaws of the mold and thus prevents breakage if anything should be between the jaws as they are closed.

When the molded blank is received from the molding table, the jaws of the molds are closed, and are held closed, until the mass is blown into permanent shape and has had sufficient time to become set. The molds are then opened and the finished bottle is removed in any suitable manner, such as by means of the removing mechanism described in my copending application Serial Number 308,193, hereinabove referred to.

Suitable means are provided for stopping the molds 146 at the proper position; for example such as the means herein described with reference to the molds of the molding machine.

Figures 7, 8:
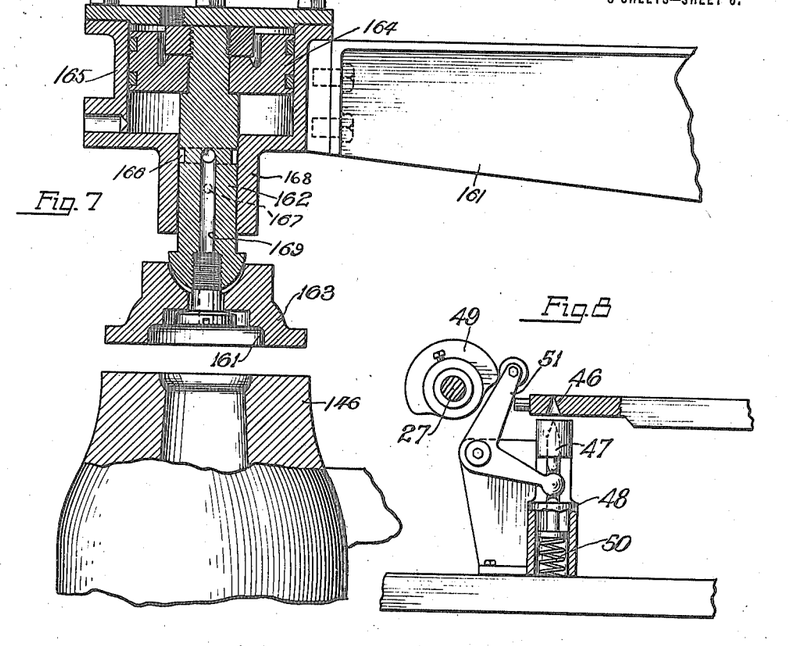
Fig. 7 is an enlarged sectional view of one of the blowing devices.
Fig. 8 is a sectional view along the line 8—8 of Fig. 1.
Figure 9:
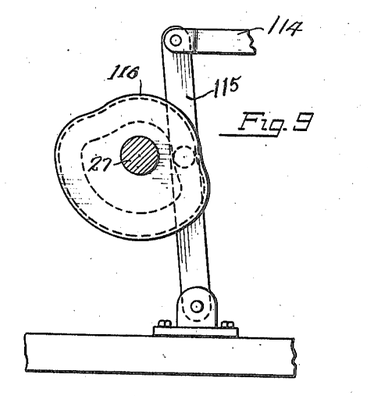
Fig. 9 is an enlarged view along the line 9—9 of Fig. 2.
Figure 10:
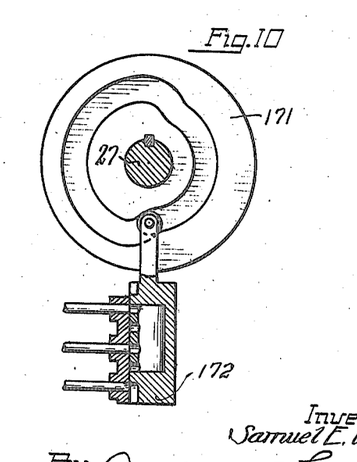
Fig. 10 is an enlarged sectional view along the line 10—10 of Fig. 1.
Figure 11:
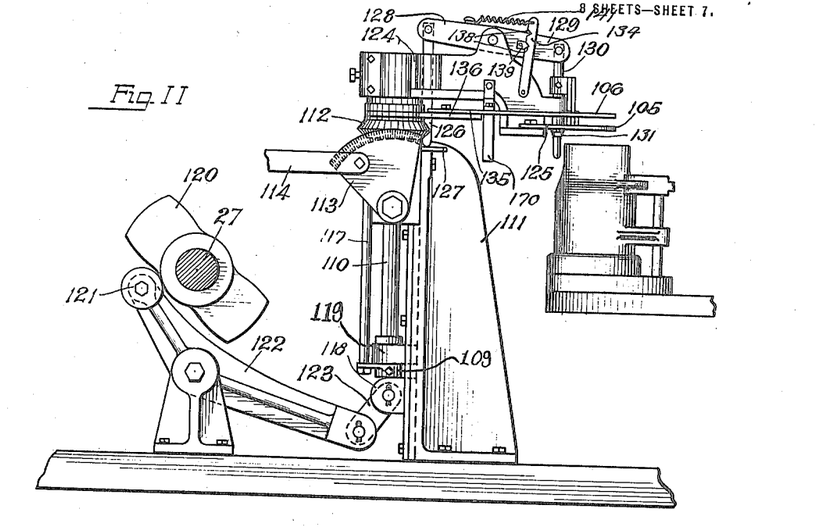
Fig. 11 is a sectional view along the line 11—11 of Fig. 2.
Figure 12:
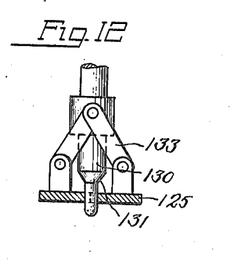
Fig. 12 is a sectional view along the line 12—12 of Fig. 6.
Figure 13:
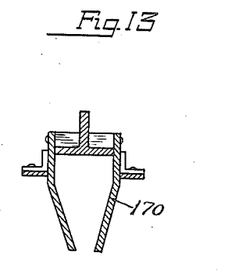
Fig. 13 is a sectional view along the line 13—13 of Fig. 6.
Figure 14:
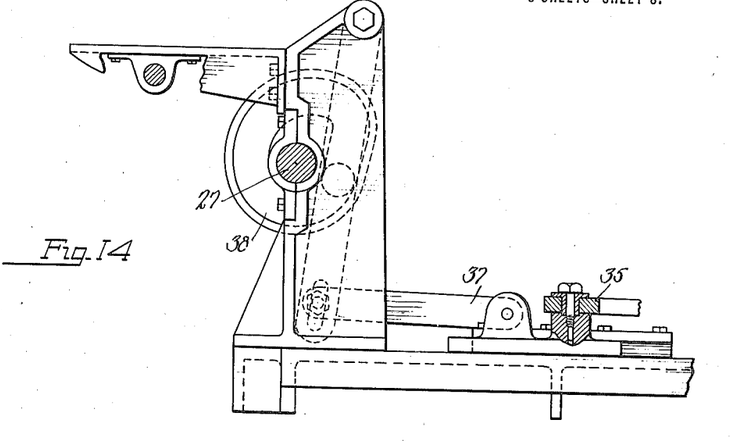
Fig. 14 is an enlarged sectional view along the line 14—14 of Fig. 2.
Figure 15:
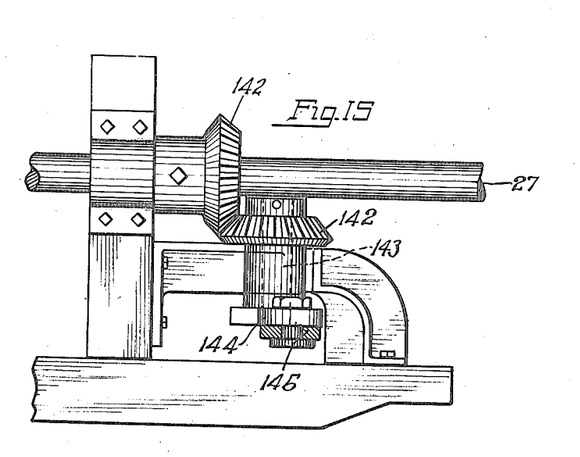
Fig. 15 is an enlarged view along the line 15—15 of Fig. 2.

After the molded blank is placed in the blow mold, in the manner described, the table is rotated step by step until the mold is brought into position opposite the numeral 180. The blowing mechanism is then brought into operation and the blank is blown substantially into the final shape desired. However, to more perfectly shape the bottle, the mold is then moved to the next position and is again blown so as to correct any defects due to the first blowing process. Any suitable mechanism may be provided for blowing the bottles. I prefer for the purpose a Y-shaped support 161, each of the arms of the support carrying a blowing mechanism comprising a cap 163, supported by a piston rod 162. The rod is attached to a piston 164 in a cylinder 165. By means of this mechanism, and a suitable supply of compressed air, by passing the compressed air into the upper end of the cylinder 165, the cap 163, at the proper time is pressed down onto the upper end of the mold 146. As the piston rod descends the annular groove 166 registers with a compressed air inlet 167, in the casing 168, and compressed air passes into the bottle blank through the passageway 169, and the blank is blown into proper shape. When this process is completed the piston 164 is forced upwardly by passing compressed air into the lower end of the cylinder 165, thus removing the cap 163 from the mold and the mold containing the bottle is moved along under the other arm of the Y support 161, and the blowing process is repeated. The bottle is then left in the mold, as the table is rotated until the glass has hardened sufficiently to be removed, when the mold is opened as hereinabove described, and the bottle is removed in any suitable manner, as by means of the transferring device illustrated and described in my said copending application, Serial No. 308,193.

In order to insure operation of all of the devices at exactly the right time the operating mechanism of each is directly connected to the common driving shaft 27. This is particularly desirable with the operating mechanism of the plunger. This mechanism comprises a valve 172 for passing compressed air into the cylinder 80. This valve is operated by a cam wheel 171 directly connected to the common driving shaft 27. By the use of a cam for operating this valve the time the plunger is to be in the mold can be accurately predetermined; and this time can be adjusted to different purposes by merely changing the cam for another of suitable shape.

I claim as my invention:

1. In a glass manufacturing machine, glass molding mechanism for forming blanks, glass blowing mechanism, means for transferring the blanks from said molding mechanism to said blowing mechanism, said means comprising a clamp for grasping one end of the blanks, and a means for enclosing the other end of the blank.

2. In a glass manufacturing machine, glass molding mechanism for forming blanks, glass blowing mechanism, means for transferring the blanks from said molding mechanism to said blowing mechanism, said means comprising a clamp for grasping one end of the blanks, means for enclosing the other end of the blank, and means for opening and closing said clamp.

3. In a glass manufacturing machine, glass molding mechanism for forming blanks, glass blowing mechanism, means for transferring the blanks from said molding mechanism to said blowing mechanism, said means comprising a clamp for grasping one end of the blanks, means for enclosing the other end of the blank, and means for opening and closing said enclosing means.

4. In a glass manufacturing machine, glass molding mechanism for forming blanks, glass blowing mechanism, means for transferring the blanks from said molding mechanism to said blowing mechanism, said means comprising a clamp for grasping one end of the blanks, means for enclosing the other end of the blank, and means for elevating and lowering said clamp.

5. In a glass manufacturing machine, glass molding mechanism for forming blanks, glass blowing mechanism, means for transferring the blanks from said molding mechanism to said blowing mechanism, said means comprising a clamp for grasping one end of the blanks, means for enclosing the other end of the blank, and means for simultaneously lowering and opening said clamp.

6. In a glass manufacturing machine, glass molding mechanism for forming blanks, glass blowing mechanism, means for transferring the blanks from said molding mechanism to said blowing mechanism, said means comprising a clamp for grasping one end of the blanks, means for enclosing the other end of the blanks, means for simultaneously lowering and opening said clamp, and opening said enclosing means.

7. In a glass manufacturing machine, glass molding mechanism for forming blanks, glass blowing mechanism, means for transferring the blanks from said molding mechanism to said blowing mechanism, said means comprising a clamp for grasping one end of the blanks, means for enclosing the other end of the blank, means for opening and closing said clamp, and means for locking said opening and closing means in the open position.

8. In a glass manufacturing machine, glass molding mechanism for forming blanks, glass blowing mechanism, means for transferring the blanks from said molding mechanism to said blowing mechanism, said means comprising a clamp for grasping one end of the blanks, means for enclosing the other end of the blanks, and means for elevating and lowering said clamp independently of said enclosing means.

9. In a glass manufacturing machine, glass molding mechanism for forming blanks, glass blowing mechanism, means for transferring the blanks from said molding mechanism to said blowing mechanism, said means comprising a clamp for grasping one end of the blanks, means for enclosing the other end of the blank, and means for passing said clamp through said enclosing means.

10. In a glass manufacturing machine, glass molding mechanism for forming blanks, glass blowing mechanism, means for transferring the blanks from said molding mechanism to said blowing mechanism, said means comprising a clamp for grasping one end of the blanks, means for enclosing the other end of the blank, and means for passing said clamp through said enclosing means, and means for opening said enclosing means as said clamp passes through said enclosing means.

11. In a glass molding machine, means for grasping the molded article, means for elevating the grasping means, means for enclosing the lower end of said article, means for moving said grasping means and enclosing means away from the machine.

12. In a glass molding machine, means for grasping the molded article, means for elevating the grasping means, means for enclosing the lower end of said article, means for moving said grasping means and enclosing means away from the machine, and means for lowering said grasping means, and means for opening said grasping means.

13. In a molding machine means for removing a molded article comprising a clamp having jaws to grasp said article and means for enclosing a portion of said article to prevent deformation thereof.

In testimony whereof, I hereunto set my hand.

SAMUEL E. WINDER.